(Model.)

3 Sheets—Sheet 1.

J. A. HILBERT.
CORN HARVESTING AND HUSKING MACHINE.

No. 351,916.

Patented Nov. 2, 1886.

WITNESSES:
Chas. Nida
C. Sedgwick

INVENTOR:
J. A. Hilbert
BY Munn &Co
ATTORNEYS.

(Model.) 3 Sheets—Sheet 2.

J. A. HILBERT.
CORN HARVESTING AND HUSKING MACHINE.

No. 351,916. Patented Nov. 2, 1886.

WITNESSES:

INVENTOR:
J. A. Hilbert
BY Munn & Co.
ATTORNEYS.

(Model.)

3 Sheets—Sheet 3.

J. A. HILBERT.
CORN HARVESTING AND HUSKING MACHINE.

No. 351,916.          Patented Nov. 2, 1886.

WITNESSES:
Chas. Nida
C. Sedgwick

INVENTOR:
J. A. Hilbert
BY Munn & Co
ATTORNEYS.

UNITED STATES PATENT OFFICE.

JOHN ALOYSIUS HILBERT, OF CARROLL, IOWA.

CORN HARVESTING AND HUSKING MACHINE.

SPECIFICATION forming part of Letters Patent No. 351,916, dated November 2, 1886.

Application filed June 3, 1885. Serial No. 167,529. (Model.)

*To all whom it may concern:*

Be it known that I, JOHN ALOYSIUS HILBERT, of Carroll, in the county of Carroll and State of Iowa, have invented certain new and useful Improvements in Corn Harvesting and Husking Machines, of which the following is a full, clear, and exact description.

Reference is to be had to the accompanying drawings, forming part of this specification, in which similar letters of reference indicate corresponding parts in all the figures.

Figure 1:
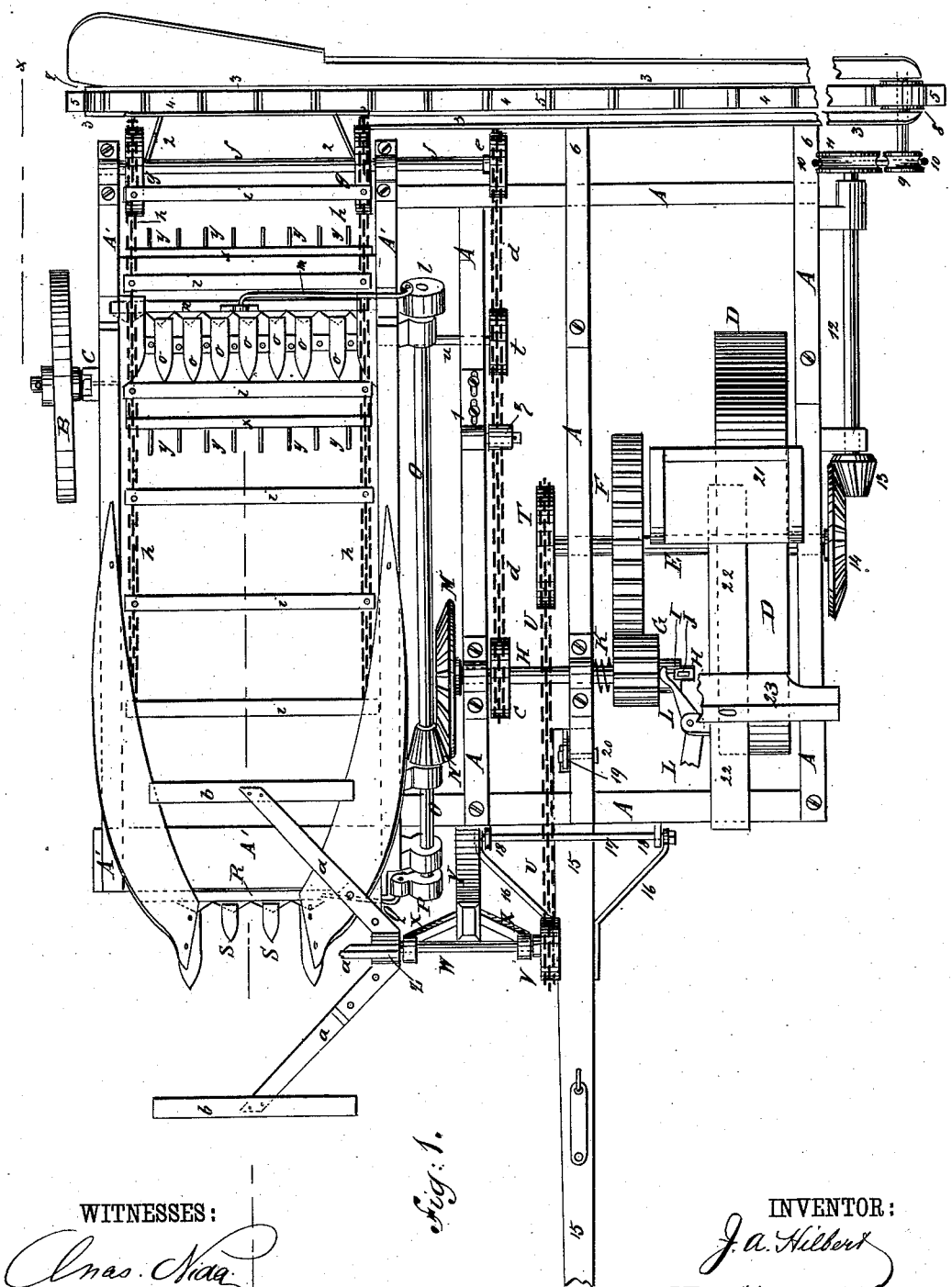
Figure 2:
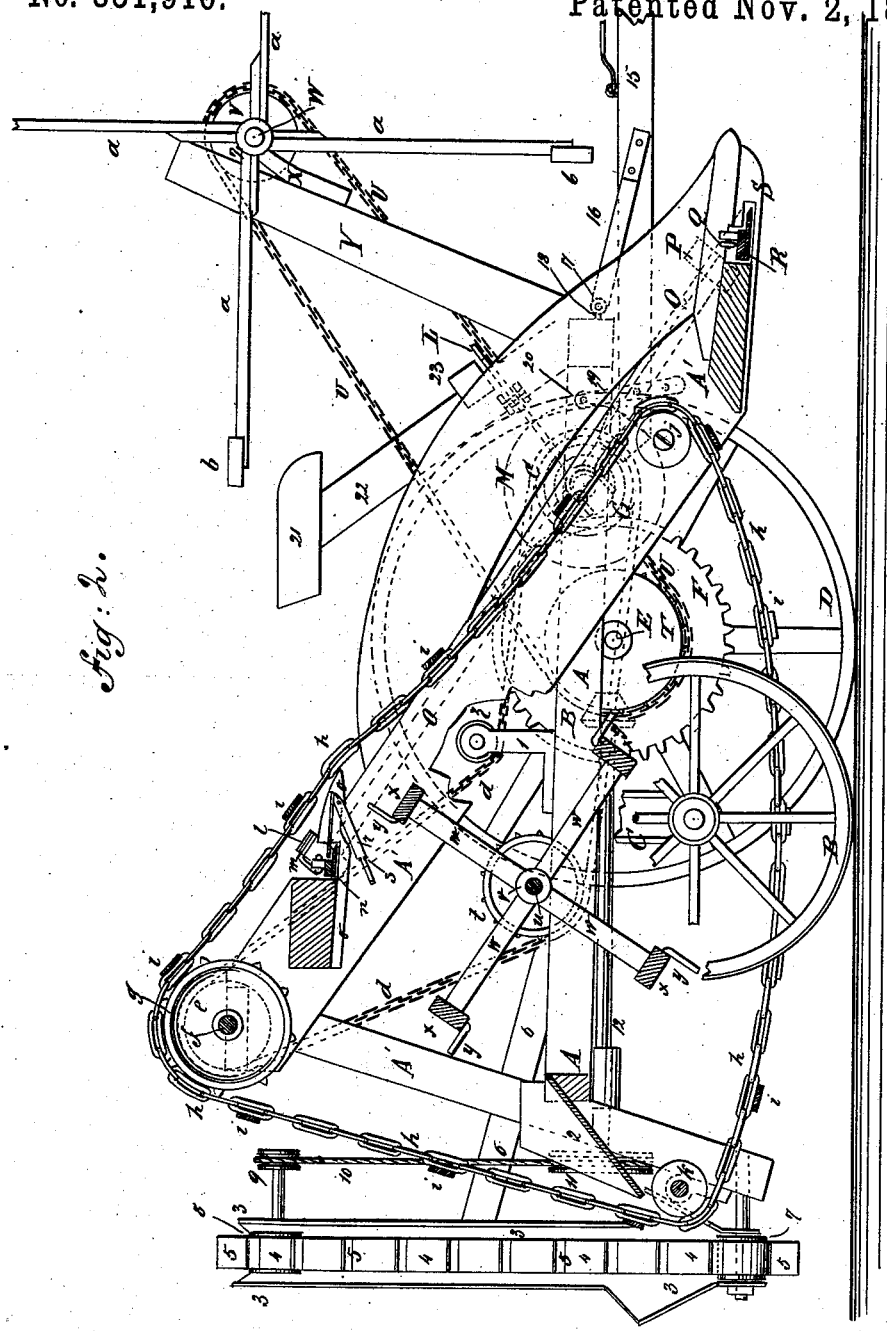
Figure 3:
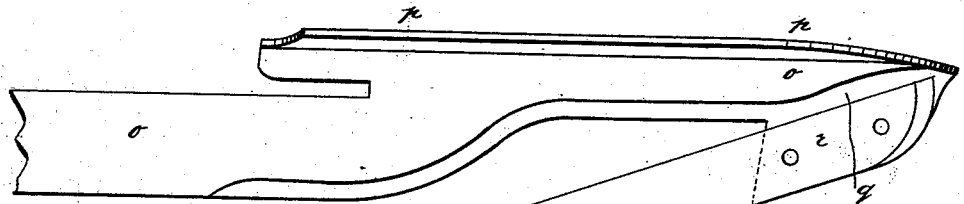
Figure 4:
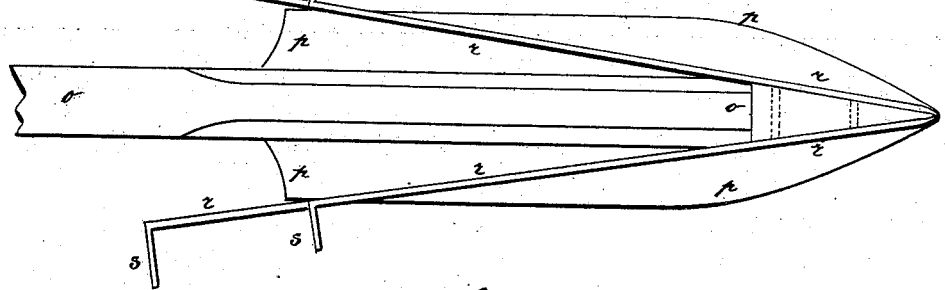
Figure 5:
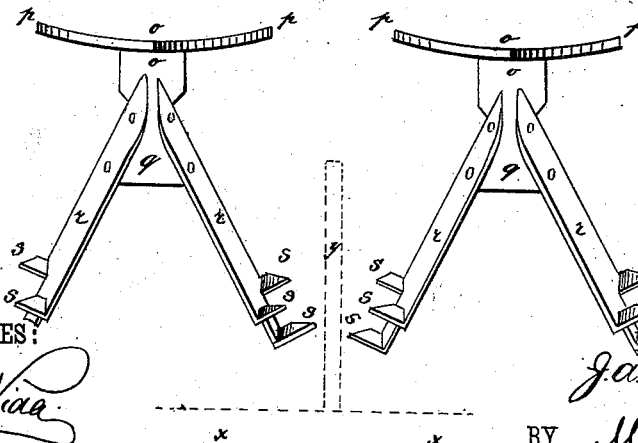

Figure 1 is a plan view of one of my improved corn harvesting and husking machines, parts being broken away. Fig. 2 is a side elevation of the same, partly in section, through the line *x x*, Fig. 1. Fig. 3 is a side elevation of one of the husking-fingers. Fig. 4 is a bottom view of the same. Fig. 5 is a front elevation of two adjacent husking-fingers, showing their relative positions, and showing in dotted lines the relation and positions of a reel-tooth and reel-bar with respect to the said fingers.

The object of this invention is to provide corn harvesting and husking machines constructed in such a manner as to cut the stalks, separate the ears from the stalks and husks, and deliver the husked ears into wagons drawn at the sides of the machine.

The invention consists in the construction and combination of various parts of the machine, as will be hereinafter fully described, and then pointed out in the claims.

A is the frame of the machine, one side of which is supported by a wheel, B, similar to a wagon-wheel, and revolving upon the journal of a crank-axle, C, attached to the same side of the frame A a little in the rear of its center. The other side of the machine is supported by the drive-wheel D, which is made large and with a wide rim to prevent it from sinking into and to give it a firm hold upon the ground. The wheel D is keyed or otherwise secured to the shaft E, which revolves in bearings attached to the longitudinal bars of the frame A, at a little distance in front of the center of the said frame.

To the shaft E is attached a large gear-wheel, F, the teeth of which mesh into the teeth of the pinion-wheel G, placed upon the outer part of the shaft H. In the outer end of the hub of the pinion-wheel G are formed recesses I, to engage with the projecting ends of a pin, J, passed through and secured to the outer end of the shaft H. The pinion-wheel G is held against the pin J by a spiral spring, K, placed upon the shaft H, and interposed between the inner end of the hub of the said pinion-wheel G and the bearing for the said shaft H. The pinion-wheel G is pushed back from the pin J to throw the mechanism out of gear by a lever, L, pivoted to a support attached to the side bar of the frame A in such a position that the lower end of the said lever can be readily swung against the outer end of the said pinion-wheel, as illustrated in Fig. 1.

To the inner end of the shaft H is attached a large beveled gear-wheel, M, the teeth of which mesh into the teeth of a beveled pinion-wheel, N, attached to the shaft O. The shaft O revolves in bearings attached to the inner side bar of the inclined frame A' of the stalk-carrier. To the lower end of the shaft O is attached a crank-wheel, P, to the crank-pin of which is pivoted the end of the pitman Q. The other end of the pitman Q is pivoted to a lug formed upon or attached to the inner part of the sickle-bar R, which slides upon the shanks of the fingers S, attached to the lower side of the front cross-bar of the stock-carrier frame A', the rear edge of the said sickle-bar R resting against and sliding upon the forward edge of the said front cross-bar, so that the stalks will be cut as the machine is drawn forward.

To the inner end of the shaft E is attached a large chain-wheel, T, around which passes an endless chain, U. The endless chain U also passes around a small chain-wheel, V, attached to the end of the reel-shaft W, which revolves in bearings in the upper ends of outwardly-inclined arms X, attached to the upper part of the reel-post Y. The lower part of the reel-post Y is attached to the front of the frame A.

To the reel-shaft W is attached a hub, Z, to which are attached the inner ends of the inclined reel-arms *a*. To the outer ends of the reel-arms *a* are attached the horizontal reel-bars *b*. With this construction, the reel Z *a b*, as the machine is drawn forward, will push the cornstalks as they are cut back upon the stalk-carrier, hereinafter described.

To the shaft H is attached a chain-wheel, c, around which passes an endless chain, d. The endless chain d also passes around a chain-wheel, e, attached to the inner end of the shaft f, which revolves in bearings attached to the upper ends of the side bars of the inclined stalk-carrier frame A'. To the shaft f, at the inner sides of the side bars of the frame A', are attached chain-wheels g, around which pass endless chains h. The endless chains h are connected by cross-bars i, preferably of iron, attached at their ends to the said endless chains, and placed about twelve inches apart. The endless chains h pass around guide-pulleys j, pivoted to supports attached to the lower parts of the side bars of the inclined stalk-carrier frame A' in such positions that the said pulleys will be in the rear of and a little above the rear edge of the forward cross-bar of the said frame, so that the endless carrier h i will receive the cornstalks as they are cut by the sickles and forced back by the reel. The endless chains h also pass around pulleys k, pivoted to bearings attached adjustably to the lower parts of the rear bars of the stalk-carrier frame A', so that the slack of the endless chains h can be readily taken up. With this arrangement the lower part of the carrier h i passes back from the chain-wheels g to the rear of and below the middle parts of the machine, so as to be out of the way of the said parts.

To the upper end of the shaft O is attached a crank-wheel, l, to the crank-pin of which is pivoted the end of the pitman m. The other end of the pitman m is pivoted to a lug formed upon or attached to the middle part of the cutter-bar n, which slides upon the shanks of the guard-fingers o, with its rear edge resting against the forward edge of the top cross-bar of the inclined stalk-carrier frame A'. The shanks of the guard-fingers o are bolted or otherwise secured to the lower side of the top cross-bar of the inclined stalk-carrier frame A'.

The guard-fingers o are made with flanges p upon the opposite sides of their upper edges, as shown in Figs. 3, 4, and 5, and are tapered to a point, as shown in Fig. 4. Upon the lower side of the forward end of each finger o is formed a downward projection, q, to the opposite sides of which are attached the forward ends of two spring-arms, r. The arms r incline downward and from each other, and to their upper and lower parts at a little distance from their rear ends, and at their rear ends are attached outwardly-projecting points s, as shown in Figs. 3, 4, and 5. The fingers o are so arranged that their forward ends will be close to the cross-bars i of the endless chains h as the said cross-bars move upward. The lower part of the endless chain d passes around a chain-wheel, t, attached to the end of a shaft, u, which revolves in bearings attached to the frame A. To the shaft u, at the inner sides of its bearings, are attached hubs v, to each of which are attached the inner ends of four equidistant radial arms, w. To the outer ends of the corresponding arms, w, are attached bars x, to the forward edges of which are attached short radially-projecting teeth y. The teeth y are so arranged as to pass between the fingers o without touching the points s, as indicated in dotted lines in Fig. 5. The endless chain d is kept taut by a pulley, z, journaled to a support, 1, the base of which rests upon a bar of the frame A, and is slotted or has several holes formed in it to receive the bolts that fasten it to the said bar, so that the said support 1 and pulley z can be readily adjusted to regulate the tautness of the said endless chain d.

To the rear end of the frame A is attached a chute, 2, to receive the husked ears and guide them into the trough 3 of the ear-carrier, up which they are carried by the endless belt 4, and drop from the upper end of the said carrier into a wagon drawn along at the side of the machine. To the endless belt 4, at suitable distances apart, are attached blocks 5, of wood or other suitable material, to prevent the ears from slipping back while being carried up the carrier. The trough 3 is secured to bars 6, attached to the frames A A', and to its lower end is journaled a roller, 7, around which the endless belt 4 passes. The endless belt 4 also passes around a roller, 8, journaled to the upper end of the trough 3, and to the inner journal of which is attached a grooved pulley, 9, around which passes an endless belt, 10. The belt 10 also passes around a grooved pulley, 11, attached to the rear end of the shaft 12, which revolves in bearings attached to the frame A, and to its forward end is attached a beveled pinion-wheel, 13. The teeth of the pinion-wheel 13 mesh into the teeth of a beveled gear-wheel, 14, attached to the outer end of the drive-wheel shaft E.

15 is the tongue to which the draft is applied, and to which, at a little distance from its rear end, are attached the forward ends of two brace-bars, 16. The brace-bars 16 incline outward toward their rear ends, and at their rear ends are hinged by a rod, 17, to eyebolts 18, or other bearings attached to the front cross-bar of the left-hand part of the frame A. The rear end of the tongue 15 is slotted to receive the lower end of the bar 19, to which it is secured by a pin or bolt. Several holes are formed in the bar 19 to receive the fastening-bolt, so that the connection between the said bar and tongue can be adjusted to regulate the height of the guard-fingers S above the ground. The upper end of the bar 19 is secured to a bar of the frame A by a bolt, 20.

21 is the driver's seat, which is attached to the upper end of the inclined standard 22. The lower end of the standard 22 is attached to the front cross-bar of the left-hand part of the frame A, and to the said standard is attached a cross-bar, 23, to serve as a rest for the driver's feet.

With this construction, as the machine is drawn along a row of corn the cutters of the sickle-bar R cut the stalks and the reel W *a b* throws the stalks back upon the stalk-carrier *h i*, the stalks resting upon the cross-bars *i* and the ears hanging down between the said cross-bars. As the cross-bars *i* pass the points of the fingers *o* the ears pass between the said fingers, and as the said cross-bars move onward and upward the butts of the ears are drawn up snugly against the side flanges of the said fingers, the forward points, *s*, checking the ears a little to insure their butts being drawn firmly against the said flanges when the said ears reach the cutters of the sickle-bar *n*, so that the stems and husks will be cut off close to the first kernels of the ears. At this instant the ears are struck by the fingers *y* of the husking-reel, are forced through between the spring arms *r*, causing the points *s* to strip the husks from the ears, and throwing the husked ears into the chute 2, down which they slide to the ear-carrier trough and are carried up the said trough and discharged into the wagon.

Having thus described my invention, I claim as new and desire to secure by Letters Patent—

1. The combination, with the stalk-cutting mechanism and an open endless stalk-carrier, of a supplemental or ear-cutter mechanism in rear of the stalk-cutting mechanism, and adjacent to the under inner surface of the endless carrier, for severing the ears from the stalks, substantially as set forth.

2. The combination, in a corn harvesting and husking machine, with the stalk-cutting mechanism and an open endless stalk-carrier, of a supplemental or ear-cutter mechanism above and in rear of the said stalk-cutting mechanism and adjacent to the under inner surface of the endless carrier, a husk-stripping mechanism adjacent to the ear-cutters, and an ear-carrier in rear of the stripping mechanism, substantially as set forth.

3. The combination, in a corn harvesting and husking machine, with the stalk-cutting mechanism and an open endless stalk-carrier, of a supplemental or ear-cutter mechanism above and in rear of the stalk-cutting mechanism and adjacent to the under inner side of said carrier, stripping-arms projecting rearward from said ear-cutter, a reel journaled below said arms and having teeth constructed to pass between said stripping or husking fingers, and a carrier in rear of the reel to receive the husked ears from the said reel, substantially as set forth.

4. In a corn-husking machine, the combination, with the frame A A' and the stalk-carrier *h i*, of the guard-fingers *o*, having flanges *p*, and spring-arms *r*, provided with teeth *s*, the cutter-bar *n*, the reel *u v w x*, having teeth *y*, and a driving mechanism, substantially as herein shown and described, whereby the ears and husks are separated from the stalks and the ears from the husks, as set forth.

5. In a corn-husking machine, the combination, with the frame A A', the flanged guard-fingers *o*, having spring-arms *r*, provided with teeth *s*, the cutter-bar *n*, and the reel *u v w x*, having teeth *y*, of the chute 2, the inclined trough 3, the carrier 4 5, and a driving mechanism, substantially as herein shown and described, whereby the husked ears are carried from the machine and delivered into a wagon, as set forth.

6. In a corn-husking machine, the husking-fingers *o*, made, substantially as herein shown and described, with side flanges, *p*, and inclined spring-arms *r*, having points *s*, whereby the ears are held while being cut from their stems and are separated from the husks, as set forth.

7. The combination, with the frame having a driving mechanism and a gear-wheel, M, operated therefrom, of the endless open stalk-carrier *h i*, the stalk-cutter bar R, and its fingers S, adjacent to the forward end thereof, the butt-cutter bar *n* and its guard-fingers in rear of the stalk-cutter and adjacent to the under inner side of the stalk-carrier, the shaft O, having the pinion N, meshing with the gear-wheel M, and the cranks P *l* at its opposite ends, connected, respectively, to the stalk-cutter and the butt-cutter, substantially as set forth.

JOHN ALOYSIUS HILBERT.

Witnesses:
PETER BERGER,
MICHAEL SCHMICH.